April 11, 1933. F. B. HUNT Re. 18,795

REFRIGERATING SYSTEM

Original Filed Jan. 21, 1927

INVENTOR.
Franklin B. Hunt,
BY
Hood & Hahn.
ATTORNEYS

Reissued Apr. 11, 1933 Re. 18,795

UNITED STATES PATENT OFFICE

FRANKLIN B. HUNT, OF CHICAGO, ILLINOIS, ASSIGNOR TO THE LIQUID CARBONIC CORPORATION, OF CHICAGO, ILLINOIS, A CORPORATION OF DELAWARE

REFRIGERATING SYSTEM

Original No. 1,746,896, dated February 11, 1930, Serial No. 162,601, filed January 21, 1927. Application for reissue filed June 27, 1930. Serial No. 464,411.

My invention relates to improvements in refrigerating systems, and it consists in the combinations, constructions, and arrangements herein described and claimed.

An object of my invention is to provide a refrigerating system for cooling syrup cans in soda fountains, and in which the cooling mechanism takes up a minimum space.

A further object is to provide a device of the type described in which the cooling of the cans is accomplished with the addition of comparatively little cooling apparatus, and in which use is made of the so-called boilers which are ordinarily used.

A further object of my invention is to provide a device of the type described wherein the refrigerant liquid may be moved through a passage which is positioned above the common liquid level.

A further object of my invention is to provide a device of the type described by means of which the high pressure in one refrigerant liquid container is utilized by forcing the liquid through an additional cooling line to the other refrigerant liquid container.

A further object of my invention is to provide a refrigerating combination comprising an evaporator in which a substantial body of volatile liquid refrigerant is normally maintained and a feed line therefor so arranged and associated with the other elements of the apparatus that a portion of said feed line may be utilized as an evaporator by means of which there may be attained a refrigerating effect less than that attainable by the first-mentioned evaporator and without interfering with the normal operation of said first-mentioned evaporator.

Other objects and advantages will appear in the following specification, and the novel features of the invention will be particularly pointed out in the appended claims.

My invention is illustrated in the accompanying drawing, forming part of this application, in which Fig. 1 is a sectional view of a soda fountain with my device applied thereto;

Figure 1:
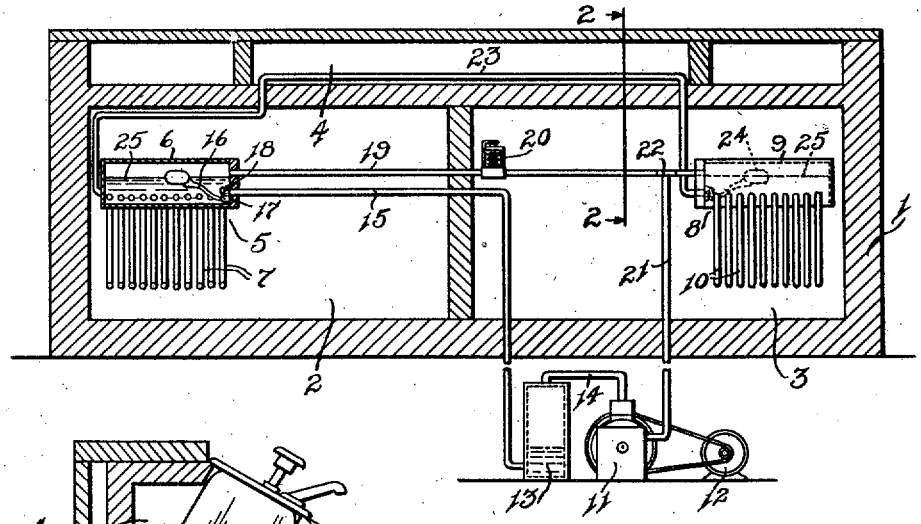

In carrying out my invention, I make use of a soda fountain 1 having aligned compartments 2 and 3 and a syrup enclosure 4 which is positioned above the compartments 2 and 3.

A high pressure boiler 5 is disposed in the compartment 2 and provided with a header 6 and a plurality of tubes or coils 7 having their ends in communication with the header 6.

A low pressure boiler 8 is disposed in the compartment 3 and provided with a header 9 having tubes or coils 10 communicating therewith.

A compressor 11 is provided with a motor 12 and communicates with a condenser 13 through a tube 14. A liquid line 15 passes from the lower portion of the condenser 13 to the lower portion of the header 6. A float valve 16 is pivotally mounted at 17 within the header 6. The float valve 16 is provided with a plunger 18 which is adapted to close the opening of the liquid line 15 for governing the flow of liquid within the header 6. A gas line 19 extends from the upper portion of the header 6 to the upper portion of the header 9 and is provided with an automatic adjusting valve 20. The purpose of the valve 20 is to maintain a predetermined pressure in the header 6 and by so doing the compressor is only allowed to draw gas from the header 6 until this predetermined pressure is reached. A gas line 21 communicates with the gas line 19 at 22 and extends to the compressor 11. A cooling line 23 extends from the lower portion of the header 6 into and through the syrup enclosure 4 and into the compartment 3 where it communicates with the lower portion of the header 9.

A portion of line 23 which traverses the enclosure 4, adequate for the desired refrigerating effect, should, of course, be non-insulated.

A float valve 24, which is identical in construction with the float valve 16, is disposed in header 9 and is adapted to govern the flow of refrigerant into header 9 so as to limit the level of liquid in said header.

A refrigerant liquid 25, such as sulphur dioxide, is disposed within the system.

Figure 2:
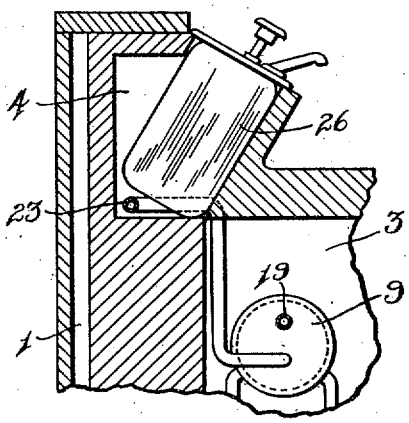
Fig. 2 is an enlarged section substantially along the line 2—2 of Figure 1.

In Fig. 2 I have shown an enlarged sectional view through the syrup enclosure 4 and it will be noted that the cooling line 23 lies beneath the syrup containers 26 which are disposed within the compartment 4.

Figure 3:
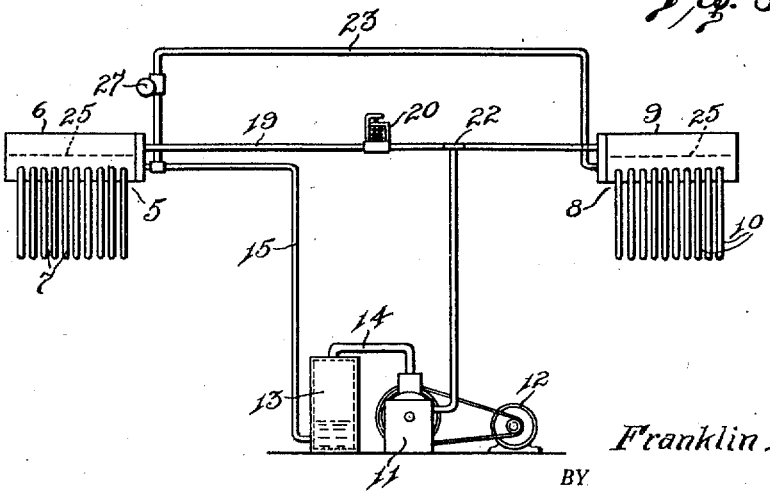
Fig. 3 is a modified form of my device.

In Figure 3, I have shown a modified form wherein the cooling line 23 is provided with an expansion valve 27 and is in direct communication with the liquid line 15 instead of through the header 6, as shown in Figure 1. The boiler 5 and the valve 20 are not essential in causing the liquid to flow through the cooling line 23. By setting the expansion valve to maintain a higher pressure in the cooling line 23 than the pressure at which the boiler 8 is operating, liquid will flow through the cooling line whenever the float valve 24 is open.

As is customary and well-known in mechanical refrigerators of the general type contemplated in this invention, the compressor 11 is provided with the usual automatic switch for starting and stopping the compressor under predetermined conditions dependent upon the amount of pressure developed within the headers 6 and 9 by evaporation of the refrigerant, the compressor 11 automatically starting upon attainment of desired maximum pressure within said headers, and stopping when a desired minimum pressure has been attained in header 9. The compressor operates to force liquid from the condenser into boiler 6 and to withdraw vapor from the upper portions of headers 6 and 9, valve 20 preventing the compressor from drawing gas from header 6 after the gas within said header has been reduced in pressure to a predetermined minimum.

The various elements are so adjusted that, in normal operation of the form shown in Fig. 1, the pressure in header 6 will be greater than the pressure in header 9.

With a volatile refrigerant, the use of which is contemplated in the present apparatus, the capacity of abstraction of heat from a surrounding medium is dependent upon the pressure under which the liquid refrigerant is maintained. In other words, such a liquid refrigerant at a given pressure has a normal temperature so that the liquid refrigerant will volatilize and thus abstract heat from the surrounding medium until the temperature thereof has been reduced to a temperature substantially equal to the normal temperature of the refrigerant at the pressure at which volatilization ceases. If such a liquid refrigerant be supplied to a pipe, like pipe 23, at a certain pressure, and the temperature of the medium surrounding that pipe corresponds to the said pressure, variations in the rate of flow of liquid through the pipe do not in any manner affect the temperature of the surrounding medium.

In either of the disclosed forms of the present invention, the fluid supply for the boiler 9 is obtained through pipe 23, a portion of which lies in the compartment 4 in which is desired a refrigerating effect less than that desired in compartment 3. The normal flow-producing pressure in pipe 23 is determined, in the form of Fig. 1, by the normal working pressure on the liquid in boiler 5, and in the form shown in Fig. 3 by the expansion valve 27. The maximums of pressure in boilers 5 and 8 are determined by the automatic starter and the suction side of the compressor 11. The flow of liquid refrigerant to boiler 8 through pipe 23 is controlled by float 24 and the lowering of liquid level in boiler 8 is produced by evaporation of the liquid in response to temperatures of the surrounding medium down to the temperature corresponding to the pressure for boiler 8 at which the automatic activation of compressor 11 occurs.

In operation, therefore, any temperature of the surrounding medium in compartment 3, higher than that which causes evaporation of liquid in boiler 8, results in evaporation of liquid in boiler 8 and a consequent increase in pressure in said boiler which, in turn, causes the compressor to start. Float valve 24 will open and permit flow from pipe 23 until the liquid level in boiler 8 rises to the desired point and this flow continues until the temperature of the surrounding medium in compartment 3 has been lowered to the desired point.

Whenever the temperature of the surrounding medium in compartment 4 is higher than that which is desired, some or all of the fluid in pipe 23 will vaporize until the desired low temperature in compartment 4 is attained, and consequently the input from pipe 23 in boiler 8 may be either vapor or liquid or both. The incoming vapor will have no effect upon the liquid level in boiler 8 and flow of liquid or vapor will therefore continue until the liquid flow has been sufficient to satisfy float valve 24. This continued liquid flow through pipe 23 will have no further effect upon the temperature of the surrounding medium in chamber 4 because the liquid in pipe 23 is under a pressure which corresponds to the then temperature of the surrounding medium in compartment 4.

Although I have shown my refrigerating system applied to a soda fountain, it is obvious that the system may be applied to numerous devices, which contain articles to be cooled, such as display cases, ice cream boxes and the like.

It will of course be understood that my invention is by no means limited to a refrigerator of the mechanical compressor type disclosed, the fundamental elements being an evaporator (the primary refrigerating element), a pressure reducer, (as for instance the intake side of the mechanical compressor), a pressure producer, (as for instance the compression side of the mechanical compressor), a condenser, and a delivery line leading from the condenser to the evaporator, a portion of that delivery line being utilized as an evaporator element for a refrigerating compartment independent of the refrigerating compartment in which the first-mentioned evaporator is mounted and having a heat-abstracting capacity, the minimum temperature limit of which is higher than the minimum temperature limit of the main evaporator.

I claim:

1. In combination with compartments, evaporators positioned within said compartments, means for supplying liquid refrigerant to said evaporators in series comprising a compressor and condenser, a liquid supply line connecting said condenser and the first of said evaporators, a second liquid supply line connecting said first evaporator and the second evaporator, means for conducting vaporized refrigerant from said evaporators to said compressor comprising a common return conduit and branch conduits connecting said evaporators with said common return conduit, and means independent of the rate of refrigerant supply for limiting the maximum level of liquid refrigerant in each evaporator.

2. In combination with aligned compartments, evaporators positioned within said compartments, means for supplying liquid refrigerant to said evaporators in series comprising a compressor and condenser, a liquid supply line connecting said condenser and the first of said evaporators, a second liquid supply line connecting said first evaporator and the second evaporator, means for conducting vaporized refrigerant from said evaporators to said compressor comprising a common return conduit and branch conduits connecting said evaporators with said common return conduit, means independent of the rate of refrigerant supply for limiting the maximum level of liquid refrigerant in each evaporator and a pressure responsive valve in the branch conduit connecting said first evaporator whereby said evaporators may be maintained at different temperatures.

3. In combination with aligned compartments and an enclosure positioned above said compartments, evaporators positioned within said compartments, means for supplying liquid refrigerant to said evaporators in series comprising a compressor and condenser, a liquid supply line connecting said condenser and the first of said evaporators, a second liquid supply line connecting said first evaporator and the second evaporator, passing through said enclosure, means for conducting vaporized refrigerant from said evaporator to said compressor comprising a common return conduit and branch conduits connecting said evaporators with said common return conduit, means independent of the rate of refrigerant supply for limiting the maximum level of liquid refrigerant in each evaporator and a pressure responsive valve in the branch conduit connecting said first evaporator whereby said evaporators may be maintained at different temperatures.

4. A refrigerating system comprising an evaporator, adapted to receive a volatile liquid refrigerant, a condenser, means for abstracting gas from said evaporator and delivering it to the condenser, a feed line leading from the condenser to the evaporator, flow-restricting means responsive to variations in level of liquid refrigerant in said evaporator between feed line and evaporator, a refrigerating compartment containing said evaporator, and a second refrigerating compartment containing a portion of said feed line, said portion serving as an evaporator.

5. A refrigerating system of the character specified in claim 4 wherein there is an expansion valve in the feed line between the condenser and the second refrigerating compartment.

6. A refrigerating system comprising an evaporator adapted to receive a volatile liquid refrigerant, means responsive to variations in the level of liquid refrigerant in said evaporator for automatically limiting the volume of liquid refrigerant in said evaporator to less than the capacity of the evaporator, a condenser, means for abstracting gas from said evaporator and delivering it to the condenser, a feed line leading from the condenser to the evaporator, a refrigerating compartment containing said evaporator, a second refrigerating compartment containing a portion of said feed line, said portion serving as an evaporator, and an expansion valve in the feed line between the condenser and the second refrigerating chamber.

7. A refrigerating system comprising an evaporator adapted to receive a volatile liquid refrigerant, a refrigerating compartment containing said evaporator, a second similar evaporator, a second refrigerating compartment containing said second evaporator, means for automatically limiting the volume of liquid refrigerant in each of said evaporators to less than the capacity thereof, a gas communication between the gas spaces of said evaporators, a condenser, means for abstracting gas from said evaporators and delivering it to the condenser, means insuring greater gas pressure in one evaporator than the other under the action of said abstracting means, a conduit between the condenser and the evaporator having the greater gas pressure, a conduit leading from below the normal fluid level in said last-mentioned evaporator to the other evaporator, and a third refrigerating compartment containing a portion of said conduit, said portion serving as an evaporator.

8. A refrigerating system comprising an evaporator adapted to receive a volatile liquid refrigerant, refrigerating compartment containing said evaporator, a second similar evaporator, a second refrigerating compartment containing said second evaporator, means responsive to variations in liquid levels in said evaporators for automatically limiting the volume of liquid refrigerant in each of said evaporators to less than the capacity thereof, a gas communication between the gas spaces of said evaporators, a condenser, means for abstracting gas from said evaporators and delivering it to the condenser, means insuring greater gas pressure in one evaporator than the other under the action of said abstracting means, a conduit between the condenser and the evaporator having the greater gas pressure, a conduit forming a liquid communication between the condenser and evaporator of lower abstraction pressure, pressure-limiting means controlling inflow to said conduit and a third refrigerating compartment containing a portion of said conduit between the pressure-limiting means and said last-mentioned evaporator, said portion of the conduit serving as an evaporator.

9. A refrigerating system of the character specified in claim 8 wherein the pressure-limiting means is an expansion valve in the conduit between the condenser and the third refrigerating compartment.

10. A refrigerating system comprising a primary evaporator, means for reducing pressures in the evaporator by abstracting vapor from said evaporator and for producing pressure in the vapor abstracted from the evaporator, a condenser arranged to receive discharge from said pressure producing means, a conduit forming a communication between the condenser and primary evaporator and having an evaporator portion associated with a refrigerating chamber isolated from the primary evaporator, and means, dependent upon the said means for reducing pressures for insuring an evaporation-limiting pressure in the evaporator-portion of said conduit higher than the evaporation-limiting pressure attainable in the primary evaporator.

11. A refrigerating system comprising a primary evaporator, means for reducing pressures in the evaporator by abstracting vapor from said evaporator and for producing pressure in the vapor abstracted from the evaporator, a condenser arranged to receive discharge from said pressure producing means, a conduit forming a communication between the condenser and primary evaporator and having an evaporator portion associated with a refrigerating chamber isolated from the primary evaporator, an expansion valve in said conduit between the condenser and evaporator-portion of said conduit, and flow-controlling means in said conduit between the evaporator-portion of said conduit and the primary evaporator.

12. A refrigerating system comprising an evaporator, means for limiting the volume of refrigerant therein to less than the capacity thereof, a second evaporator, means responsive to variations in level of liquid refrigerant for limiting the volume of refrigerant in said second evaporator to less than the capacity thereof, means for reducing pressures in said evaporators by abstracting vapor therefrom and for producing pressure in gas received from said abstracting means, means for limiting pressure reduction in the first evaporator to less than attainable in the first evaporator, a condenser receiving from said pressure producing means, a fluid conduit from said condenser to said first evaporator and to said second evaporator through said first evaporator, and a refrigerating chamber isolated from the first and second evaporators and associated with a portion of said conduit between the second and first evaporator.

13. A refrigerating system comprising an evaporator, means responsive to variation in level of liquid refrigerant in said evaporator for limiting the volume of refrigerant therein to less than the capacity thereof, a second evaporator, means responsive to variations in level of liquid refrigerant in said second evaporator for limiting the volume of refrigerant in said second evaporator to less than the capacity thereof, means for reducing pressures in said evaporators by abstracting vapor therefrom and for producing pressure in gas received from said abstracting means, means for limiting pressure reduction in the first evaporator to less than attainable in the first evaporator, a condenser receiving from said pressure producing means, a fluid conduit from said condenser to said first evaporator and to said second evaporator, an expansion valve in the conduit between the condenser and second evaporator, and a refrigerating chamber isolated from the first and second evaporators and associated with a portion of said conduit between the expansion valve and the second evaporator.

FRANKLIN B. HUNT.